United States Patent
Andersson

(10) Patent No.: US 11,358,472 B2
(45) Date of Patent: Jun. 14, 2022

(54) ELECTRIC SYSTEM

(71) Applicant: Bombardier Transportation GmbH, Berlin (DE)

(72) Inventor: Svante Andersson, Västerås (SE)

(73) Assignee: Bombardier Transportation GmbH, Berlin (DE)

( * ) Notice: Subject to any disclaimer, the term of this patent is extended or adjusted under 35 U.S.C. 154(b) by 292 days.

(21) Appl. No.: 16/487,656

(22) PCT Filed: Feb. 16, 2018

(86) PCT No.: PCT/EP2018/053871
§ 371 (c)(1),
(2) Date: Aug. 21, 2019

(87) PCT Pub. No.: WO2018/153780
PCT Pub. Date: Aug. 30, 2018

(65) Prior Publication Data
US 2019/0389311 A1    Dec. 26, 2019

(30) Foreign Application Priority Data
Feb. 24, 2017  (SE) .................................. 1750202-2

(51) Int. Cl.
| B60L 3/00 | (2019.01) |
| B60L 3/04 | (2006.01) |
| B60L 58/25 | (2019.01) |
| B60L 50/51 | (2019.01) |
| H01H 33/26 | (2006.01) |

(52) U.S. Cl.
CPC ............... B60L 3/0069 (2013.01); B60L 3/04 (2013.01); B60L 58/25 (2019.02); B60L 50/51 (2019.02); B60L 2200/26 (2013.01); H01H 33/26 (2013.01)

(58) Field of Classification Search
None
See application file for complete search history.

(56) References Cited

U.S. PATENT DOCUMENTS

| 2010/0328014 A1 | 12/2010 | Suzuki et al. |
| 2013/0175144 A1 | 7/2013 | Sprenger et al. |
| 2014/0061011 A1 | 3/2014 | Nakamura et al. |
| 2016/0336131 A1 | 11/2016 | Fellmer et al. |
| 2017/0025872 A1* | 1/2017 | Kang ................... H02J 7/0091 |
| 2021/0207895 A1* | 7/2021 | Bissell ................ F28D 20/0039 |

FOREIGN PATENT DOCUMENTS

| DE | 10 2007 051 504 A1 | 4/2009 |
| EP | 3 121 156 A1 | 1/2017 |
| WO | 99/26328 A1 | 5/1999 |

* cited by examiner

Primary Examiner — Jared Fureman
Assistant Examiner — Aqeel H Bukhari
(74) Attorney, Agent, or Firm — Dilworth & Barrese, LLP

(57) ABSTRACT

An electric system has an electrical energy source connected to an electrical energy sink by at least one feeding line. Each feeding line (8) is in at least one position therealong between said source and said sink provided with an arrangement configured to interrupt arcing in the feeding line would such arcing reach this position. The arrangement has a temperature dependent member which upon an increase of the temperature thereof above a predetermined level activates an irreversible movement of movable means (24) which by this movement cuts off the arc (a) and/or removes hot ionized gases (28) and by that prevents the arcing to continue in the feeding line past the arrangement.

22 Claims, 24 Drawing Sheets

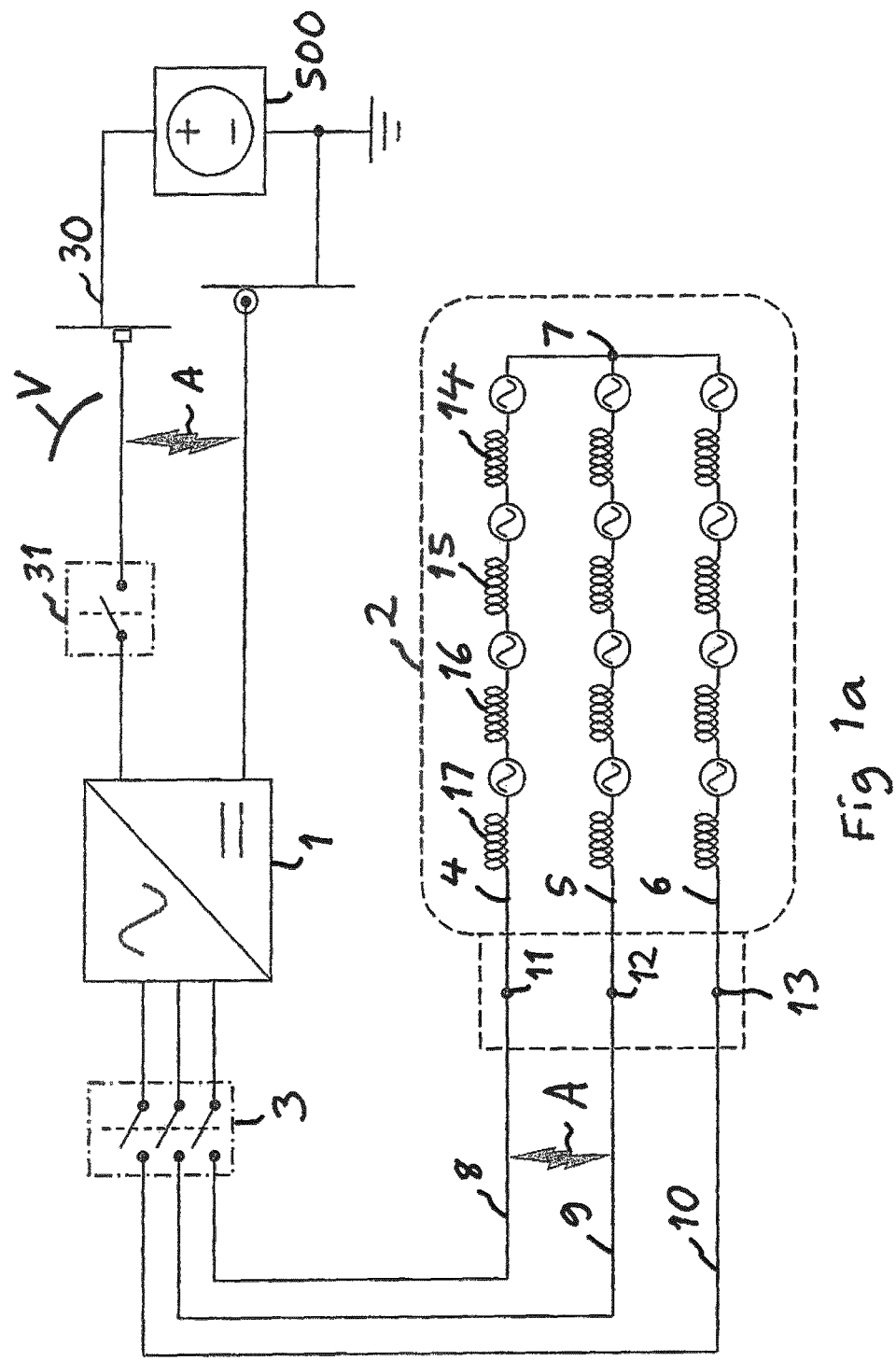

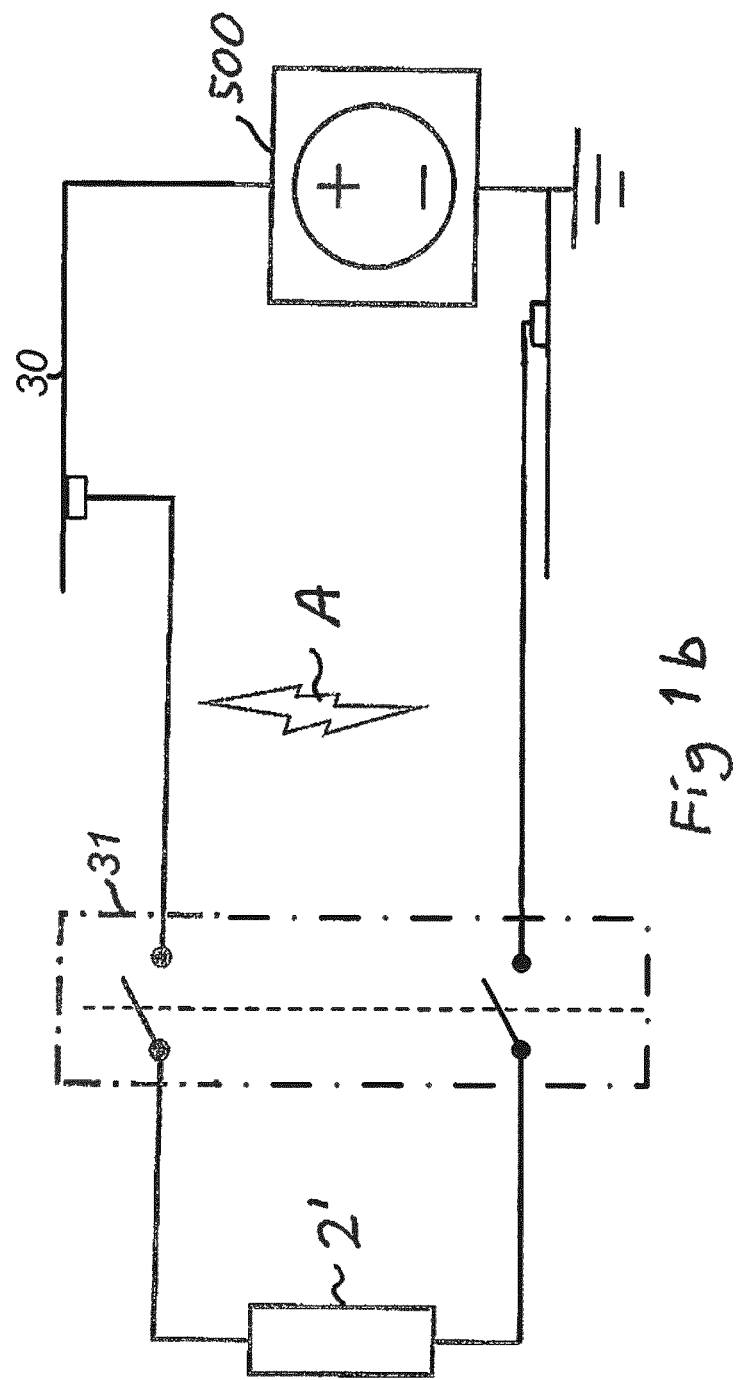

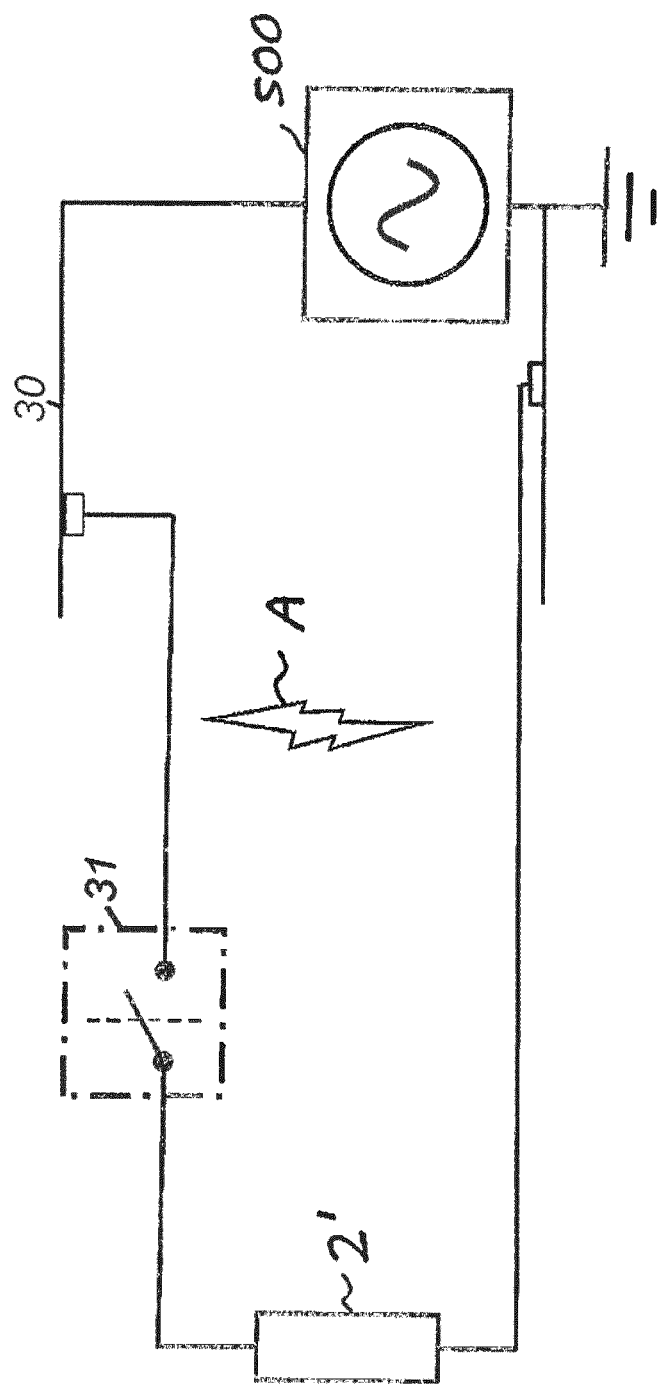

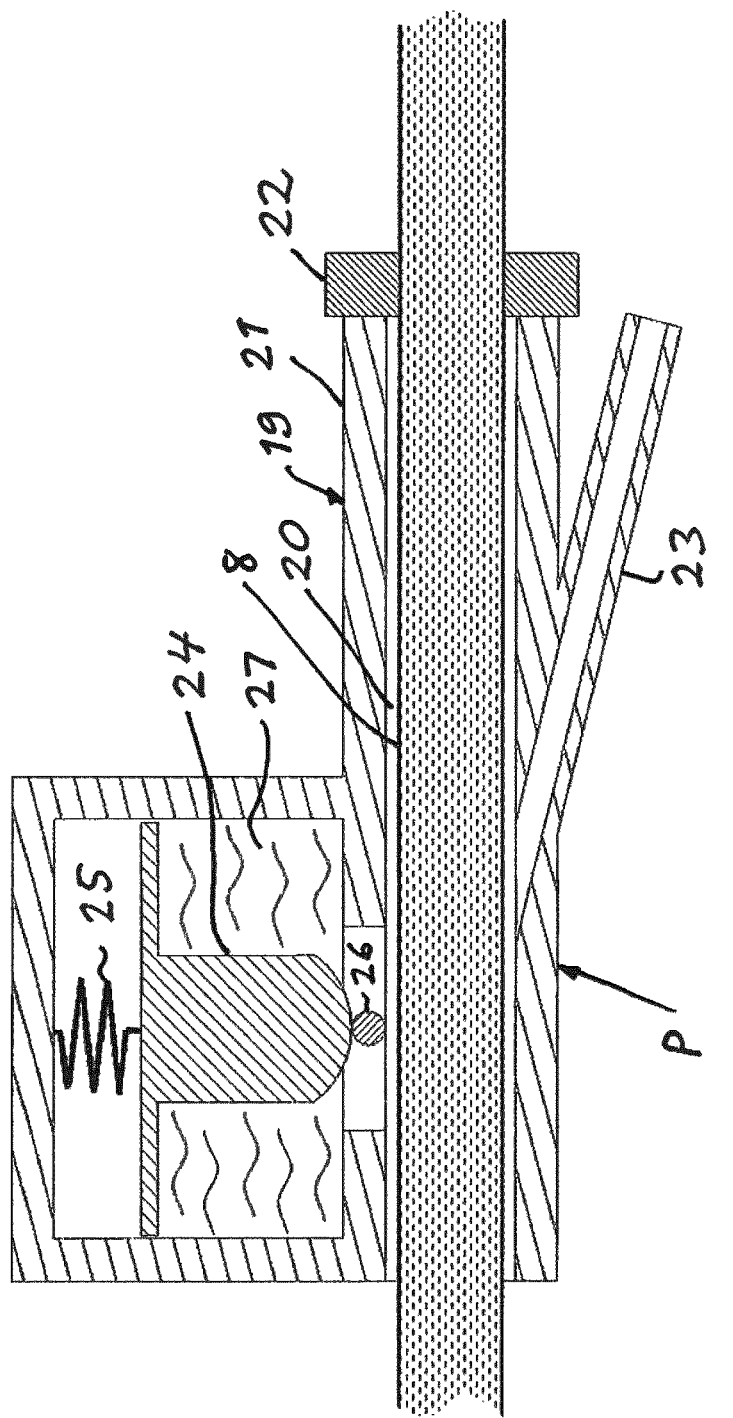

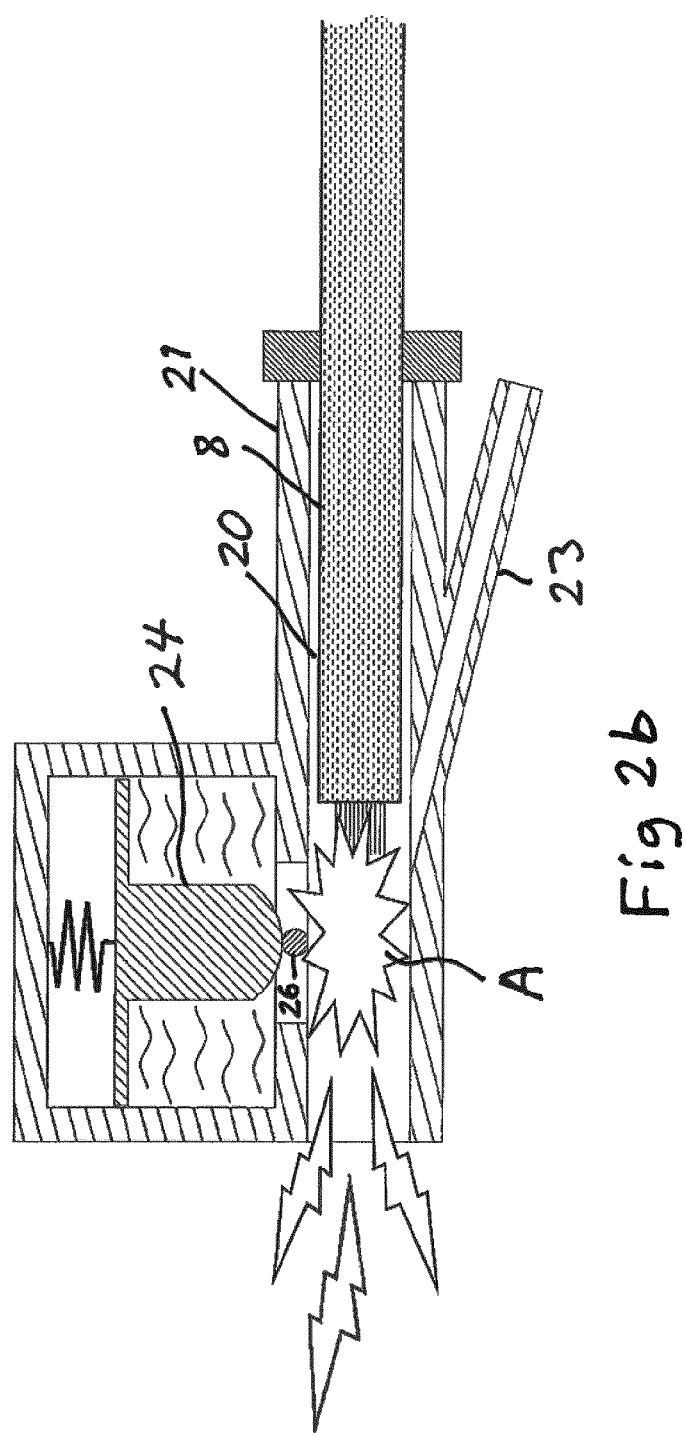

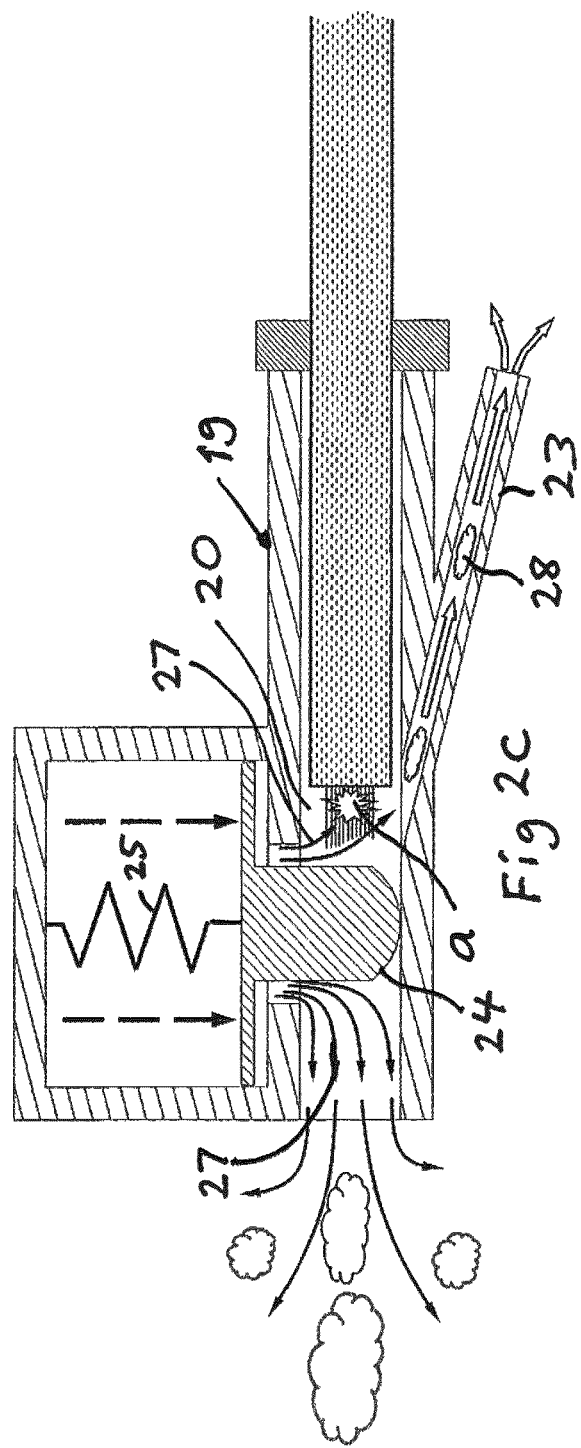

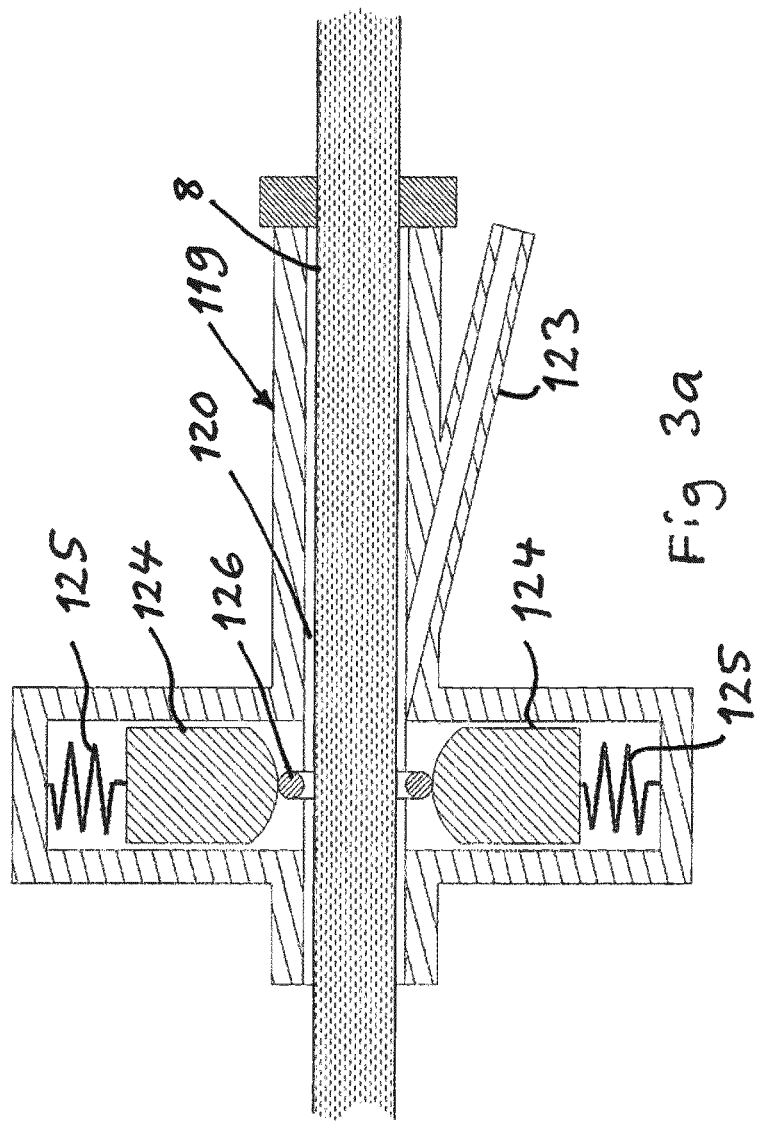

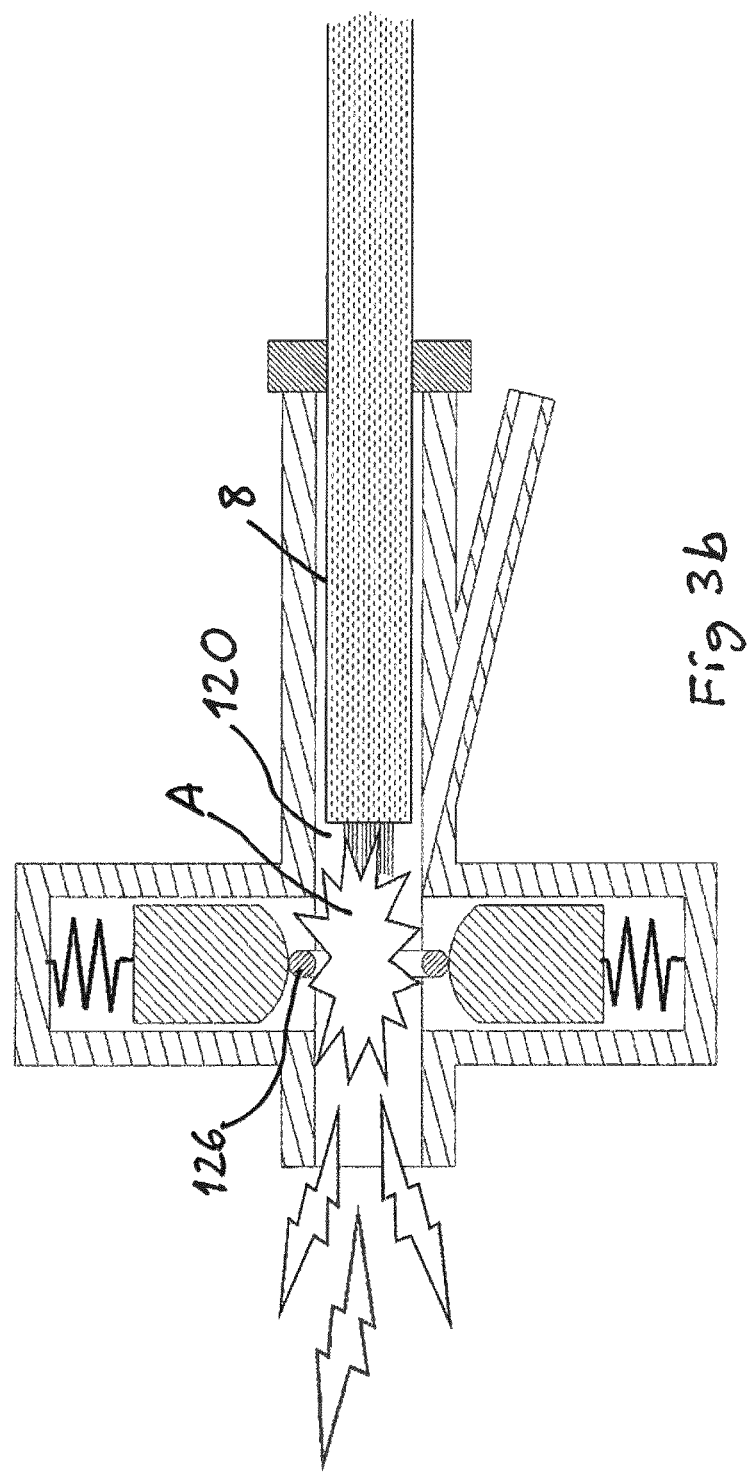

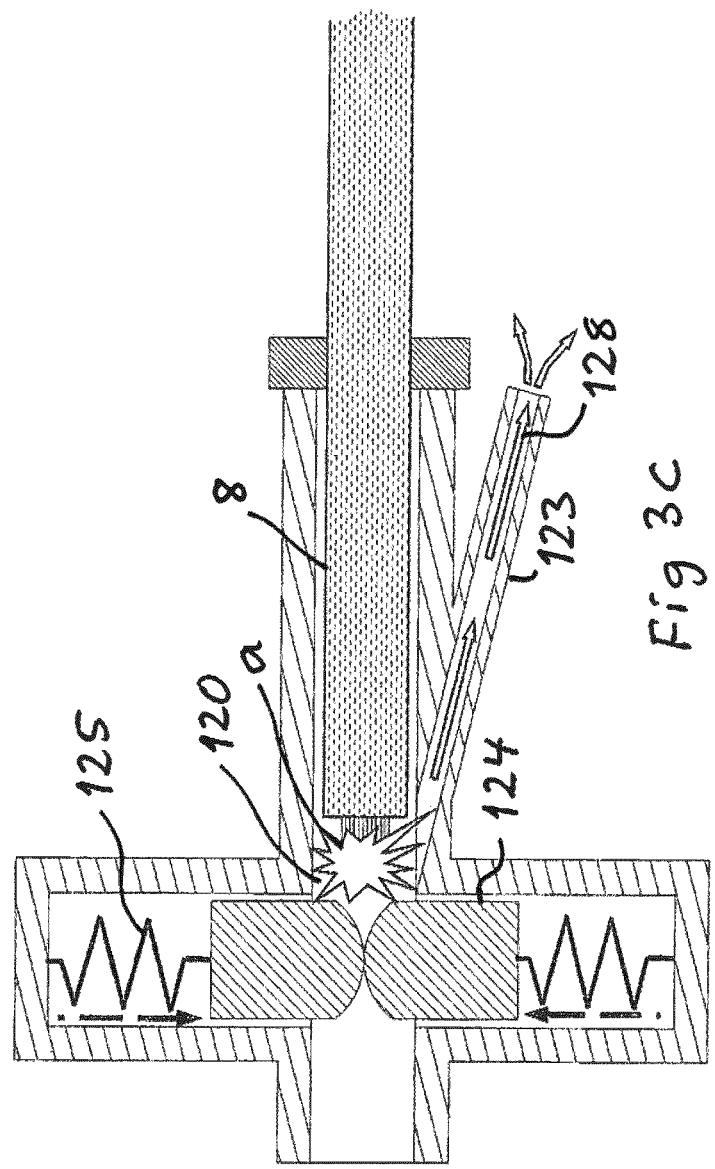

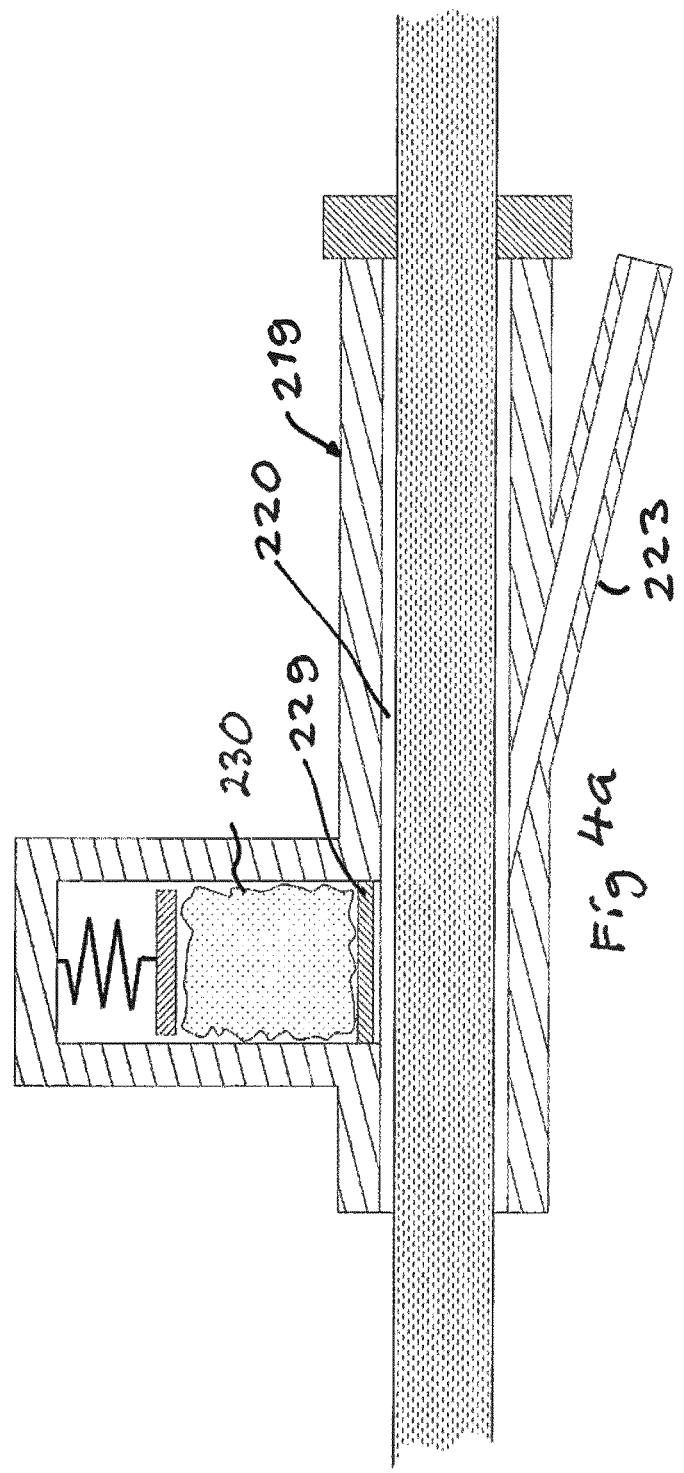

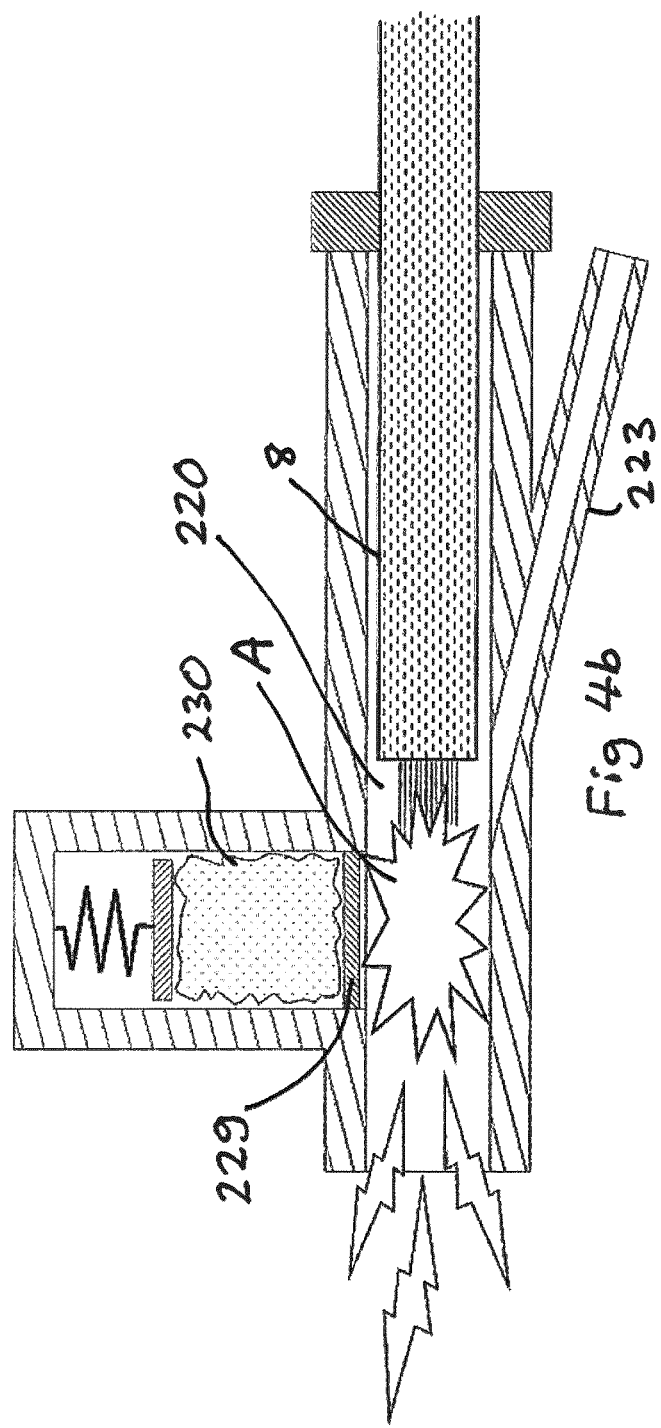

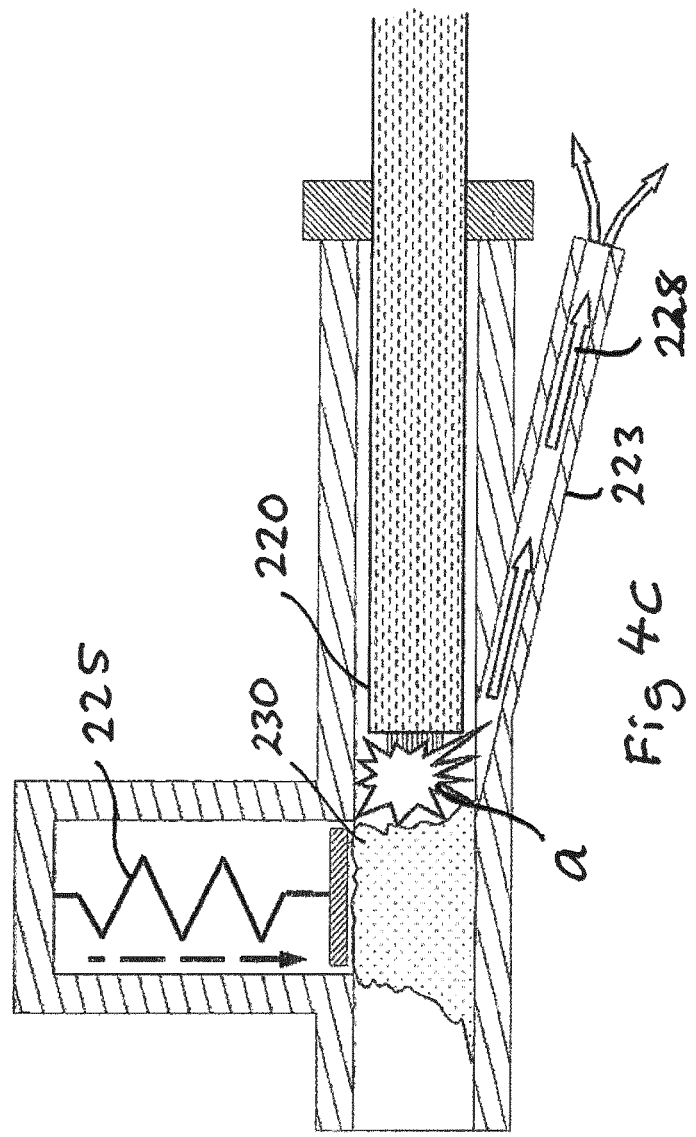

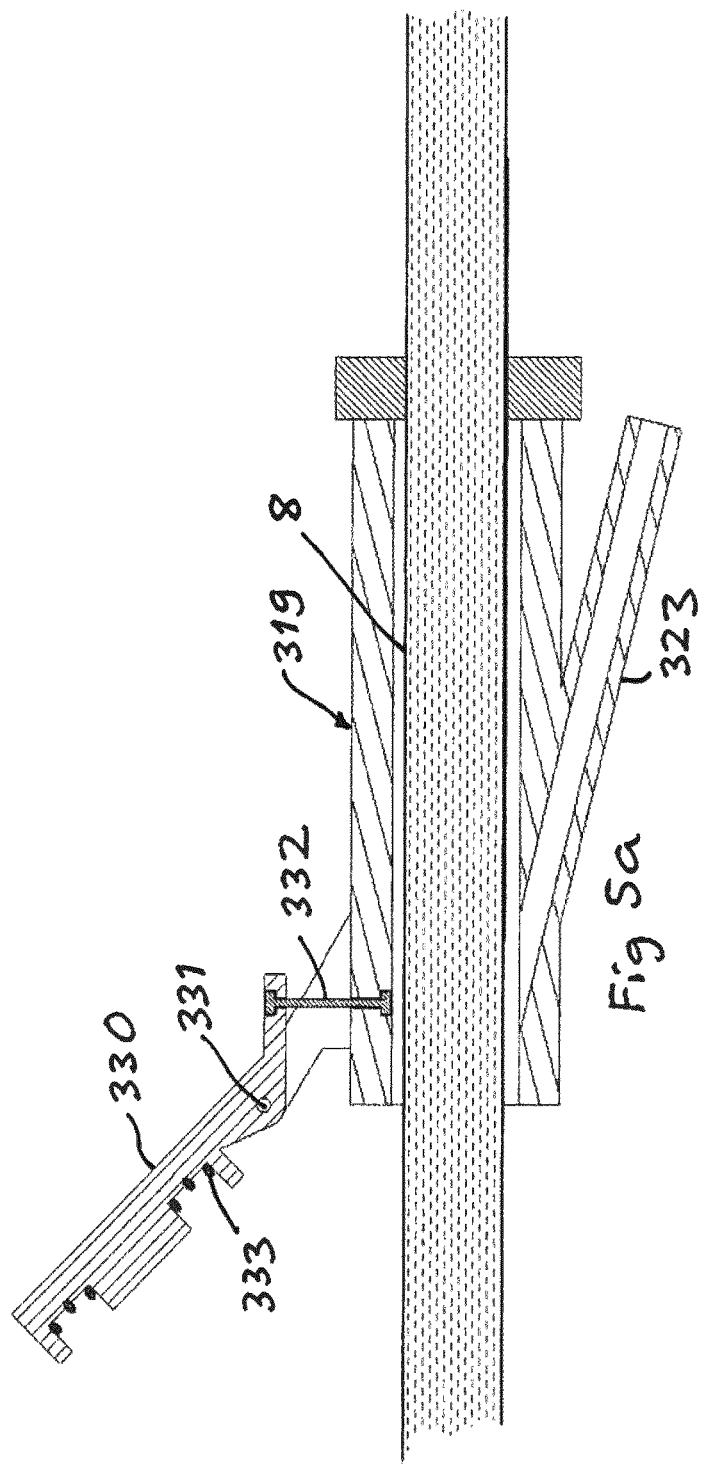

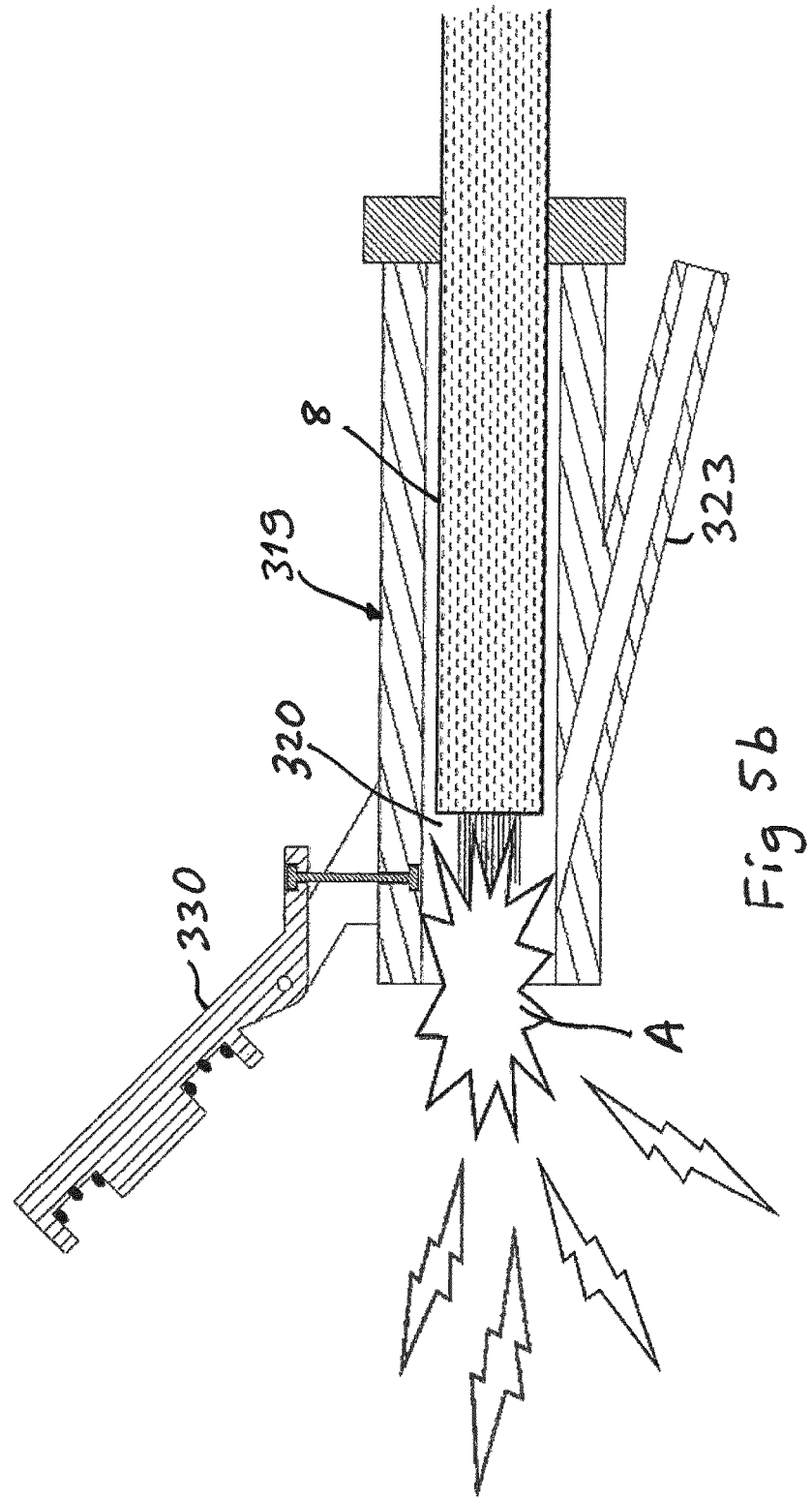

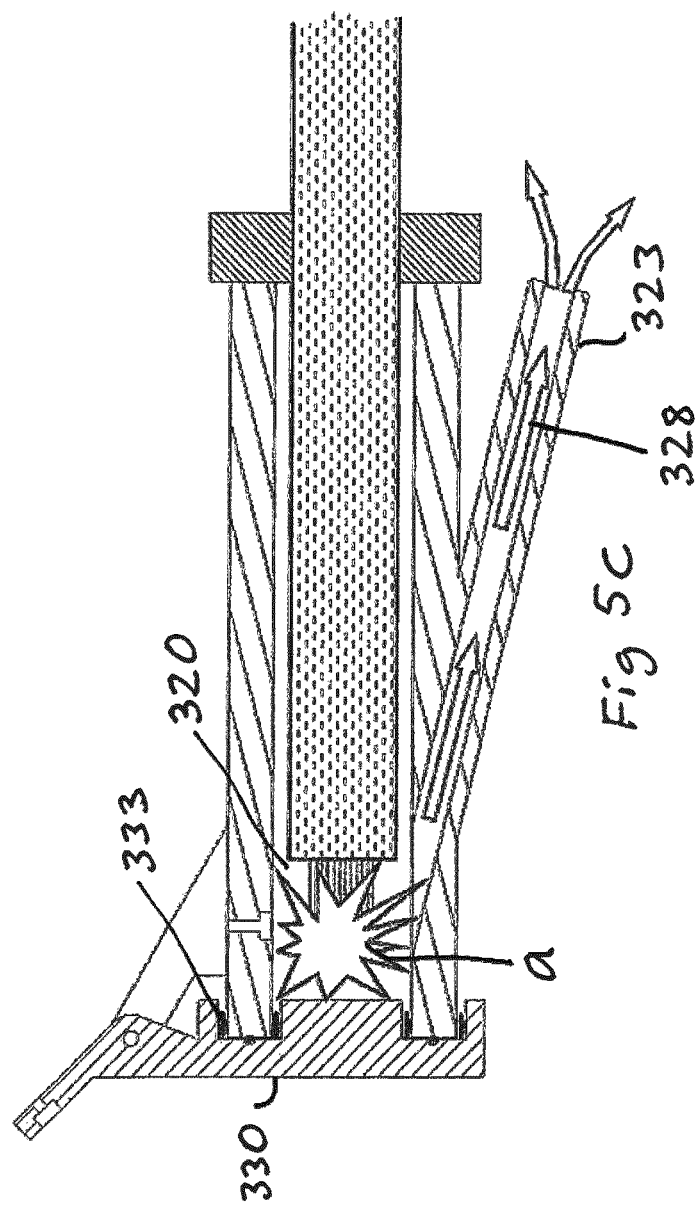

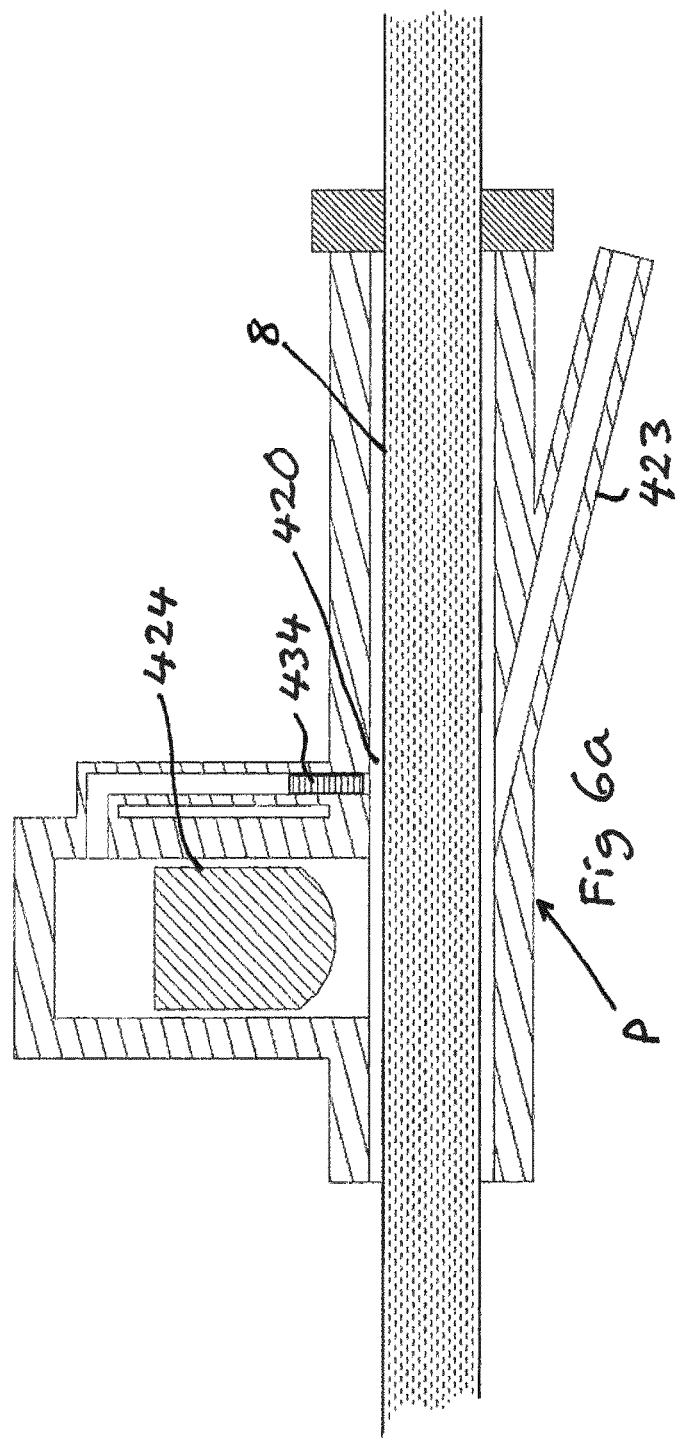

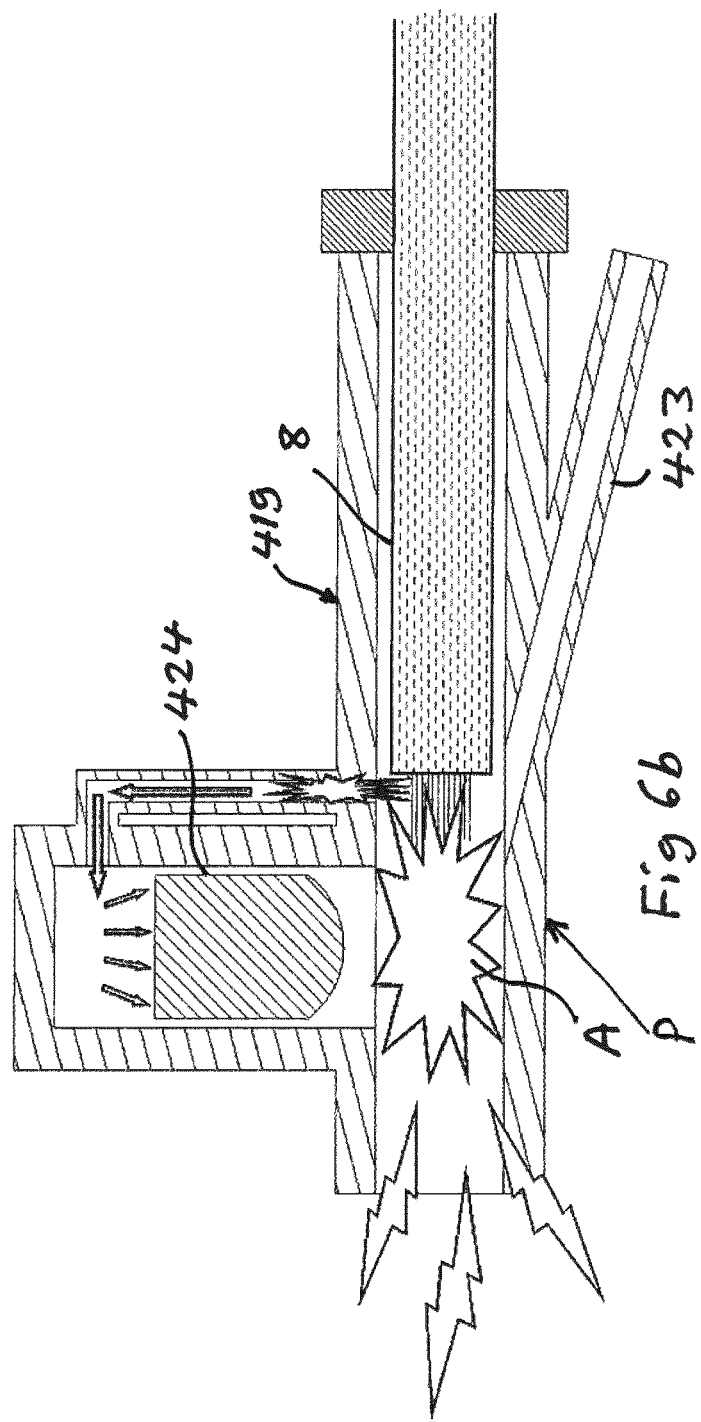

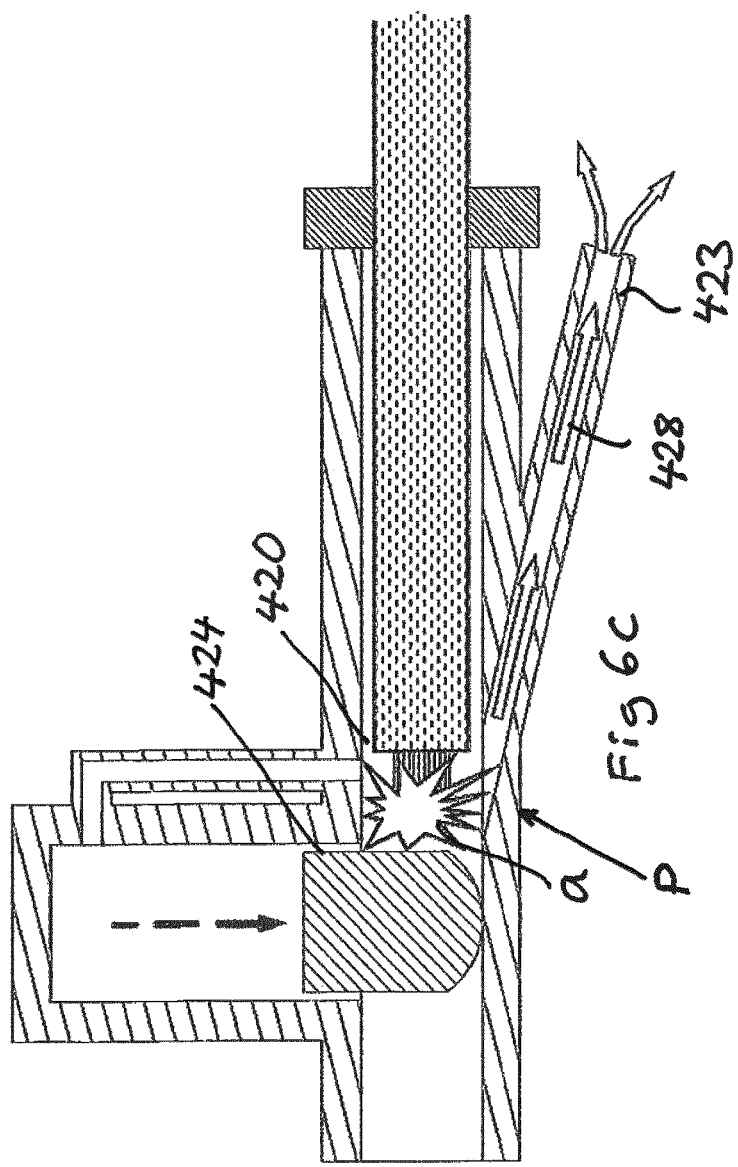

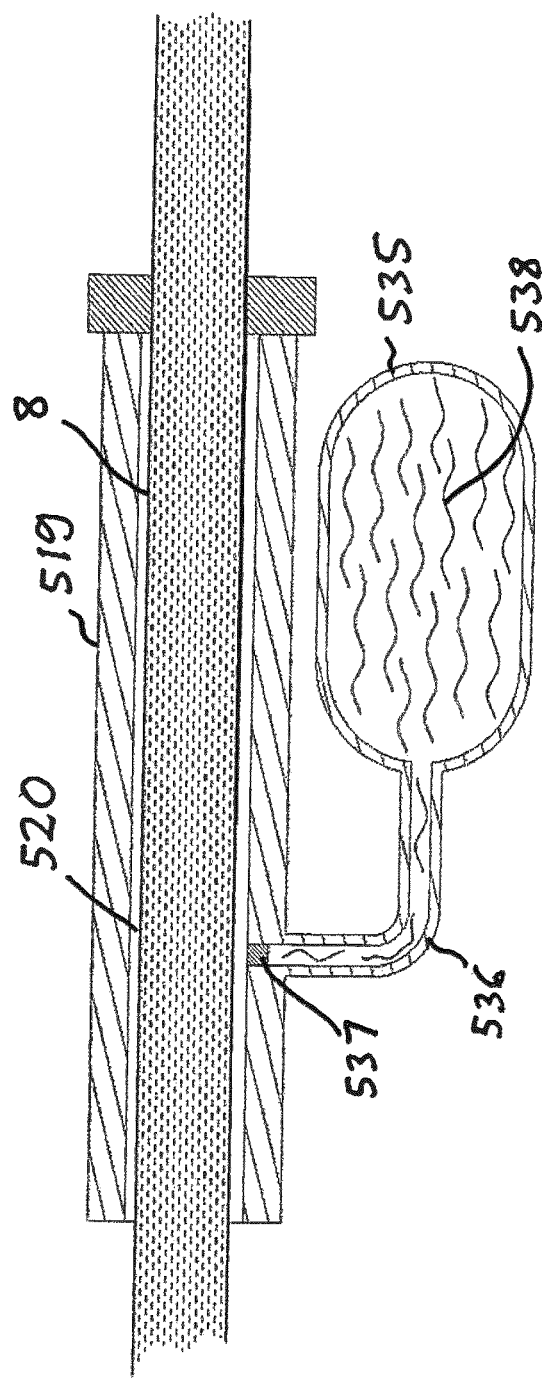

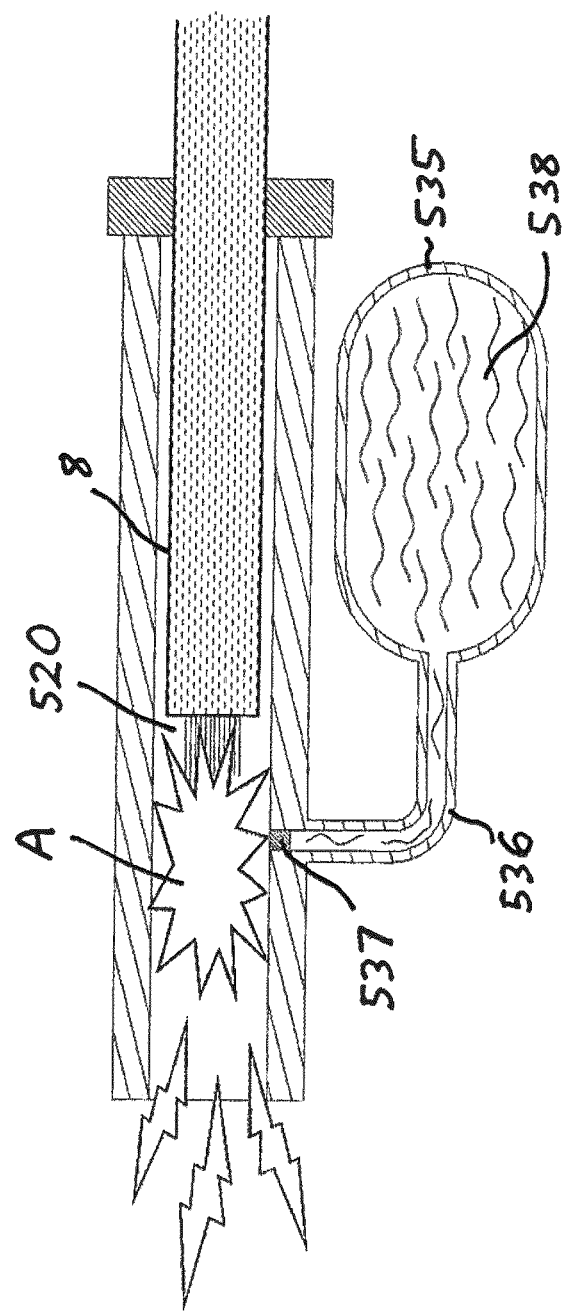

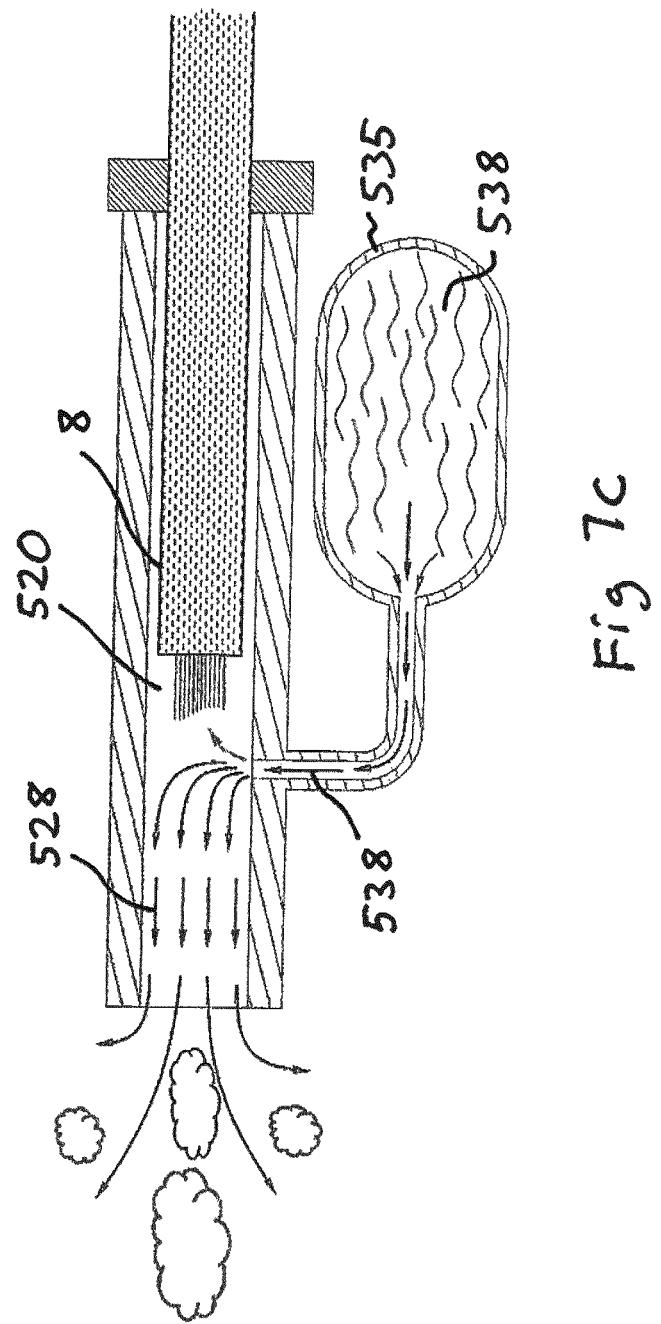

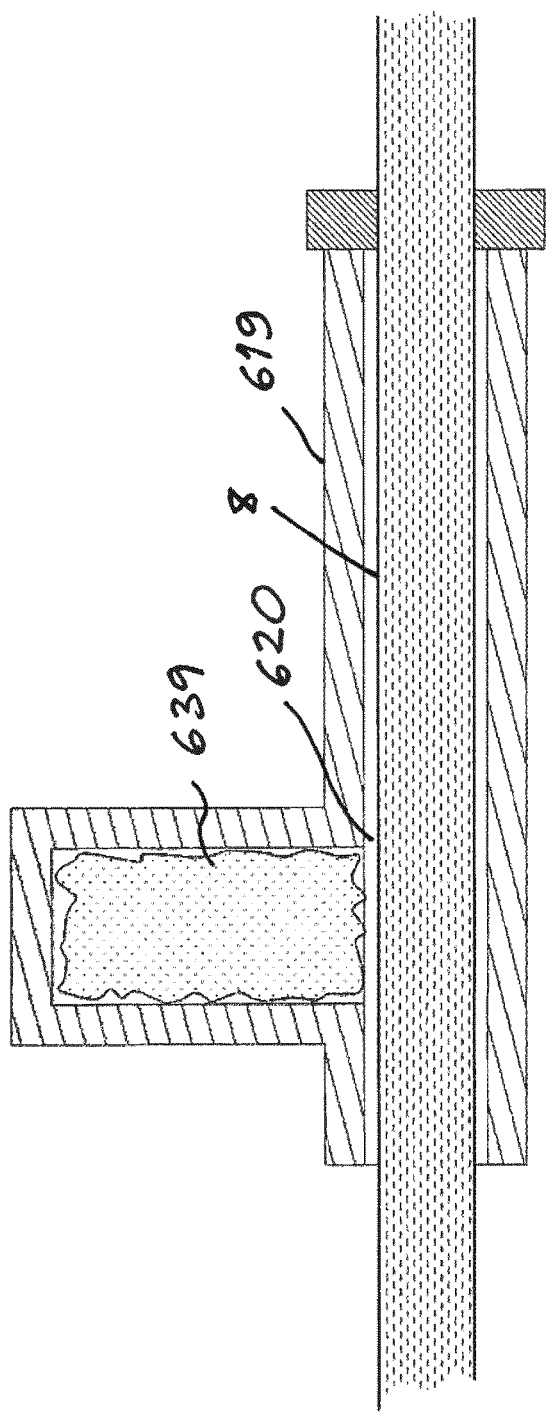

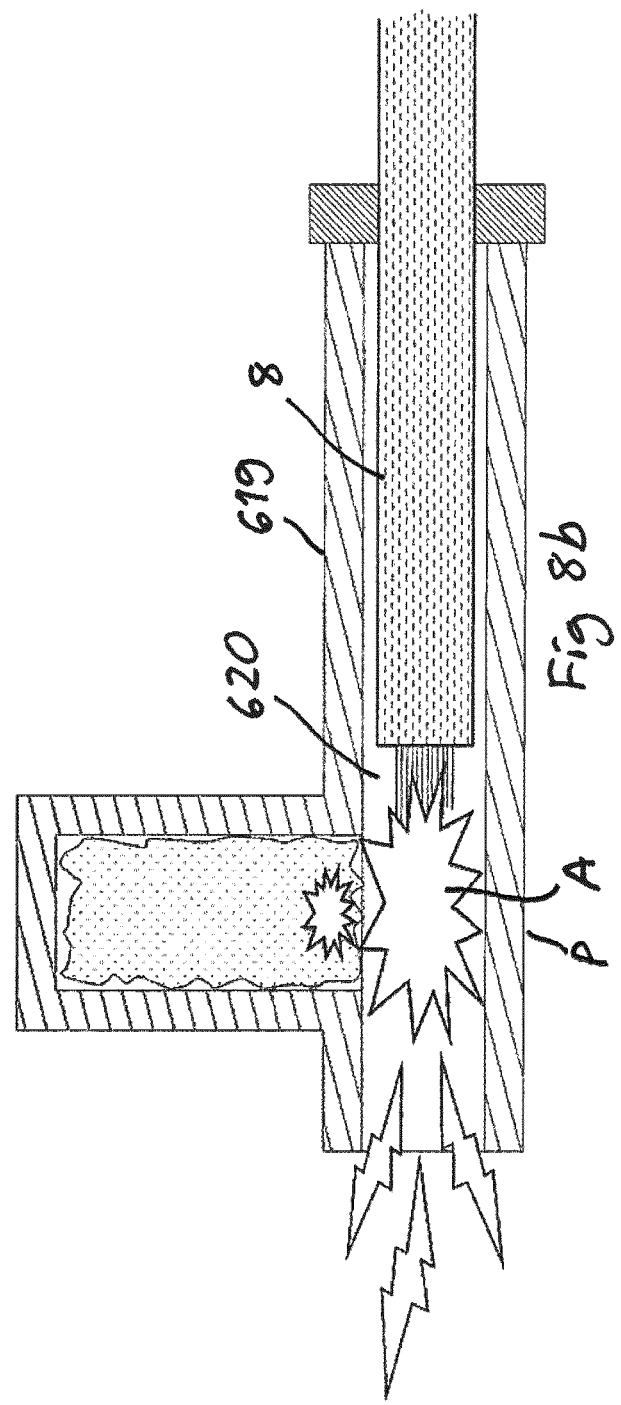

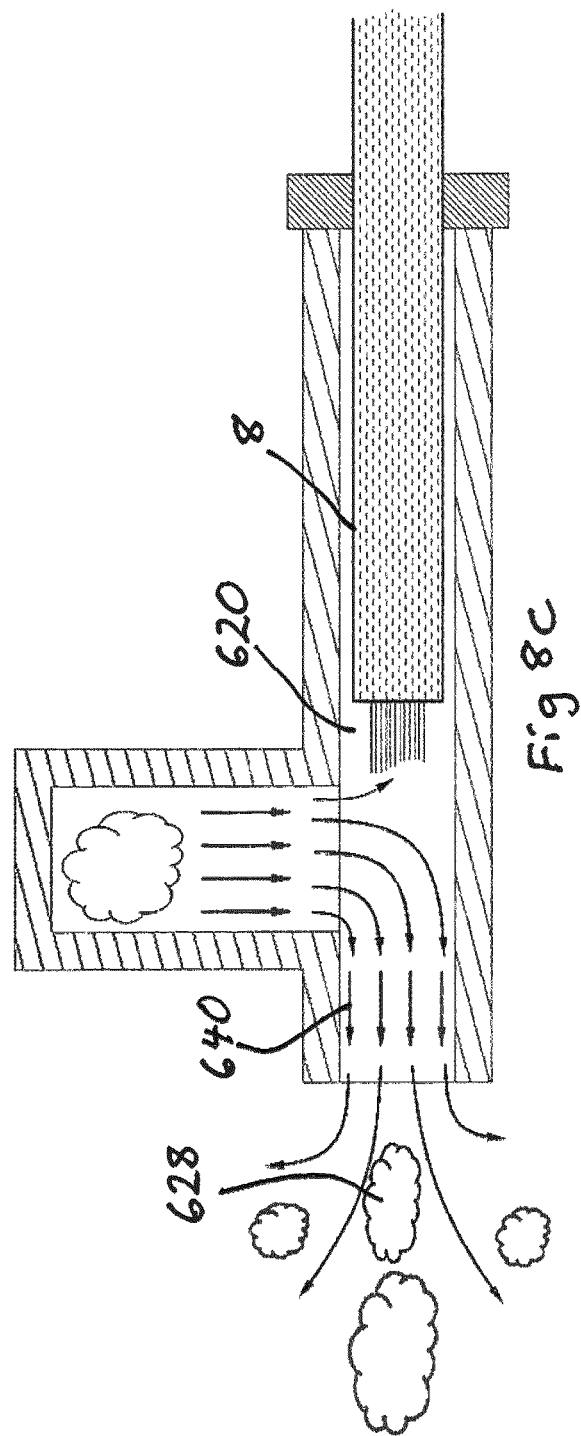

ELECTRIC SYSTEM

The present invention relates to an electric system comprising
an electrical energy source, and
an electrical energy sink connected to the electrical energy source through at least one feeding line.

The electrical energy source may be of any conceivable type delivering electric energy in the form of AC or DC in said at least one feeding line towards the electrical energy sink, which may receive electrical DC power or AC power, which in the latter case may be in the form of a one phase alternating voltage or a multiple-phase alternating voltage. A converter of any type may be arranged along the feeding line between the energy source and the energy sink and this may then be of any conceivable type, for example a AC/DC-, DC/AC- or DC/DC-converter. However, an electric system for propulsion of a rail vehicle with an electrical energy sink in the form of at least one electric machine will hereinafter mainly be discussed for illuminating the invention but not in any way restrict the invention to that application.

The electric machine of such an electric system may of course operate as motor as well as generator when braking the vehicle. When such an electric machine is operating as a motor a high torque capability with respect to a determined size of the motor is an important feature and is offered by this type of electric machine using a plurality of permanent magnets to produce the magnetic flux of the rotor. Such a motor has lower rotor losses and a higher efficiency compared to an induction motor. However, a drawback of an electric machine in the form of such a permanent magnet motor is the induced voltage at the terminals of the electric machine that is present as soon as the rotor rotates, which means as the rail vehicle in question moves. The electric machine may then act as an electrical energy source feeding into a fault when this occurs in a part of the system close to the machine and it will be difficult to disconnect the electric machine from the adjacent feeding line because the electric machine is located in a bogie, where there is very little space and which is subjected to very severe vibrations and shocks. The nearest place where a conventional circuit breaker could be located is therefore several meters of cable away. In case there is a short-circuit or a flash-over between the phases of the electric machine, this can lead to arcing between the phases which will produce high temperatures and large amount of heat and accordingly a risk of fire. This risk is particularly severe in metro applications, where the vehicle constantly operates in tunnels.

FIG. 1a illustrates schematically a known electric system of this type on board a rail vehicle V having a converter 1 connected to the electrical energy sink in the form of an electric machine 2 through phase lines 8-10 via a contactor 3 which can isolate the electric machine voltage from the rest of the propulsion system if there is some kind of failure. The converter interacts here with a feeding line in the form of a DC-contact line 30 connected to a DC electrical energy source 500 for power supply in either direction therethrough. The connection between the DC contact line 30 and the converter 1 can be interrupted by Line Circuit Breaker 31. It is shown how the three phase windings 4-6 of the electric machine each has one end connected to the other phase windings at a star point 7 and one end connected to a phase line 8-10 at terminals 11-13 in connection box 18. It is pointed out that the invention also relates to a design having no contactor between the converter and the electric machine. A voltage is induced in the electric machine also when this is disconnected from the converter and each coil-group (see 14-17 for the phase 4) contributes to the induced voltage of the phase. If the potential of the star-point 7 is taken as reference, the induced voltage gradually builds up, coil-group by coil-group, so that it is the highest at the terminals 11-13. This high voltage will be present from the terminals along the respective phase line to the contactor 3.

From protection point of view the best position of the contactor 3 is as close to the electric machine as possible, since it cannot interrupt phase to phase arcing occurring between the electric machine and the contactor. Such arcing can only be stopped by reducing the induced voltage until it is too low to sustain the arc, either by reducing the speed of the train or by the arcing destroying the electric machine.

It is illustrated how arcing A may also occur between the DC contact line 30 and the converter 1, i.e. in the DC supply line to the converter. FIGS. 1b and 1c illustrate schematically how such arcing can be mitigated by the present invention when it occurs along a conductor between a DC contact line 30 and a Line Circuit Breaker 31. Instead of a DC contact line as source the system may alternatively have a battery, a fuel cell or a permanent magnet synchronous generator. In principle it can also be a system with an AC contact line as supply, but as AC supply voltages in most cases are much higher this may not be possible in practice.

The Rail Accident Report 18/2015 issued in October 2015 and relating to "Electrical arcing and fire under train near Windsor & Eton Riverside 30 Jan. 2015" discloses how in an electric system of the type defined in the introduction the critical parts of the system are enclosed by an arcing safe material. Accordingly, it would be beneficial to, in such an electrical system, be able to interrupt arcing between the electric supply and the contactor. However, the measures described in said report for protecting against arcing are purely passive and do not enable any efficient arc interruption.

SUMMARY OF THE INVENTION

The object of the present invention is to provide an electric system of the type defined in the introduction being improved with respect to known such electric systems with respect to protection against arcing arising between the electrical energy source and the electrical energy sink and where it is difficult to inactivate or disconnect the electrical energy source from an electrical fault occurring between the source and the sink.

This object is according to the invention obtained by providing such an electric system with the features listed herein.

Accordingly, said at least one feeding line of the electric system is in at least one position therealong between said source and said sink provided with an arrangement configured to interrupt arcing in the feeding line would such arcing reach said position, said arrangement comprises a temperature dependent member arranged close to the feeding line in said position and configured to, upon an increase of the temperature thereof above a predetermined level, activate an irreversible movement of movable means included in the arrangement and configured to by this movement cut off the arc (a) and/or remove hot ionized gases required to maintain the arc so as to prevent the arcing from proceeding in this feeding line of the machine side of said position. Thus, such an arrangement utilizes the temperature rise by the electric power dissipated during arcing to trigger an irreversible physical movement of said movable means to actively interrupt an arc, which will result in much better opportunities to interrupt such arcing than offered in such electric systems already known. Said movable means may be of different types, such as mechanical parts, fluids or gases. The irreversibility of the movement thereof makes the arrangement to be a very reliable single use only solution to an arcing problem arising with no possibility or risk of returning to the state of the electric system before the occurrence of the arcing without having taken measures required for putting the system in a condition preventing repeating of the arcing. Accordingly, this way of functioning is quite different than that of a circuit breaker. The described arrangement may reliably prevent arcing generated between one of the electrical energy source and the electrical energy sink and said position from reaching the source of the fault current and destroying this or other equipment.

According to an embodiment of the invention the electric system is an electric system for propulsion of a rail vehicle and it comprises as said electrical energy sink:
  an electric machine configured to act as a motor for creating a force of a rail vehicle and in its turn comprising:
    a) a stator having a stator body with at least one phase formed by a stator winding wound therearound and configured to electrically create a plurality of stator poles disposed around the inner periphery of the stator body, and
    b) a rotor rotatably disposed within the stator and having a rotor body with a plurality of permanent magnets received therein,
the system further comprises a converter, one side of which being connected to the electrical energy source and the other side of which being connected to terminals of each phase of the electric machine through electric conductors in a feeding line in the form of a phase line for each phase for feeding electric power between the converter and the electric machine, and said feeding line is provided with a said arrangement in at least one said position located along the feeding line between the electric energy source and the converter and/or in at least one said position located along the feeding line between the converter and the electric machine. Although the electric machine is during normal operation, except when braking, functioning as an electrical energy sink it may well during a fault condition in the system involving a said arcing be an electrical energy source which will continue to feed the fault until the arcing is interrupted or the vehicle is coming to stand still. This embodiment of the invention is to be interpreted to cover this scenario.

According to another embodiment of the invention the electric system comprises a said arrangement arranged in a position along a conductor connecting a Line Circuit Breaker to the electrical energy source and configured to interrupt arcing in said conductor connection would such arcing reach said position from the Line Circuit Breaker side thereof. The arrangement is then preferably located as close as possible to said electrical energy source, i. e. close to the shoegear or to the pantograph, for increasing the probability that any arcing generated is on the Line Circuit Breaker side of the arrangement. This embodiment is primarily intended to protect the shoegear and equipment between shoegear and the arrangement in case of arcing occurring between the arrangement and the Line Circuit Breaker, but in some cases it may also protect the Line Circuit Breaker and other equipment on that side of the arrangement.

According to another embodiment of the invention each phase line is in at least one position therealong between the converter and the terminal of the electric machine for that phase provided with a said arrangement configured to interrupt arcing in the phase line would such arcing reach said position from the converter side thereof. The arrangement is then preferably located as close as possible to said terminal for increasing the probability that any arcing generated is on the converter side of the arrangement.

According to another embodiment of the invention said arrangement comprises an element of arc and heat resistant material surrounding an extension of the feeding line including said position and configured to form an at least partially enclosed room around said position to have an arc cut off and/or hot ionized gases removed in that room by movement of said means. By forming a room in this way around the position arcing reaching this position may efficiently be cut off and/or hot ionized gases removed from the position where the arc is by movement of said movable means.

According to another embodiment of the invention said element includes a main tube concentrically surrounding the phase line, which constitutes a preferable feature of such an element with respect to the possibility to arrange said arrangement in a said position and realizing a said room and proper function of said movable means of the arrangement.

According to another embodiment of the invention said arrangement comprises a clamping member configured to clamp the main tube to the feeding line, so that the arrangement may sufficiently be kept in place in said position.

According to another embodiment of the invention said element includes a ventilation tube branched from the main tube in the region of said position so as to remove any possible over-pressure caused in said room by the movement of said means and release hot ionized gases away from the place of arcing. Besides the fact that the ventilation tube will remove any over-pressure caused in said room by the movement of the movable means and release the hot ionized gases away from the place of arcing these hot ionized gases will then also be cooled as they pass through the ventilation tube and be less likely to contribute to further arcing when they are released.

According to another embodiment of the invention one or several said movable means are configured to carry out said movement to cut off an arc in said room upon consumption of the feeding line by said arcing past a location where the movable means will move. The mechanical cut off of the arcing path, enclosing or sealing the remaining end of the conductor in said room and separating it from the remaining ionized gas outside the room will efficiently interrupt the arc.

According to another embodiment of the invention one or several said movable means comprises a body configured to cut off an arc by movement thereof in said room. The movement of such a body, such as a piston, will efficiently cut off an arc and separate the remaining end of the conductor supplying the fault current from the ionized gas outside and, thus, interrupt the current.

According to another embodiment of the invention one or several said movable means is configured to close said room when the arc has reached into the room by carrying out said movement. Such closing or sealing of said room by a movable means having accordingly the function of a shutter will efficiently cut off an arc and interrupt the current.

According to another embodiment of the invention one or several said movable means are made of a flexible material which when compressed in one direction will expand in other directions. This flexible material will improve the sealing of said room and may for instance be rubber.

According to another embodiment of the invention the movable means are made of a powder of an electrically insulating and heat resistant material. Such a powder will efficiently seal off the arc. Thus, "movement of movable means" as used in this disclosure shall be interpreted to also cover "flow of an arc extinguishing substance".

According to another embodiment of the invention said movable means comprises an arc extinguishing substance, for instance in the form of a gas or liquid, configured to move into said room when the feeding line has been consumed to a location inside said room so as to remove hot ionized gases from said room by blowing/pushing them out thereof towards the electrical energy sink side thereof. An arc present in said room may be efficiently extinguished by removing the hot ionized gases required to maintain the arc from that room by introducing said arc extinguishing substance thereinto.

According to another embodiment of the invention said arrangement comprises a container containing said movable means and having a connection to said room, the temperature dependent member is configured to keep this connection closed at a temperature below said predetermined level and to open it upon an increase of the temperature above said predetermined level. This means that said gas or liquid will efficiently be released into said room to remove hot ionized gases when arcing enters said room and raises the temperature therein.

According to another embodiment of the invention said arrangement comprises said movable means in the form of solid material arranged in the region of said room and configured to be gasified by a temperature increase in said room upon an arcing entering said room so as to move into said room. This constitutes a further option to efficiently extinguish an arc inside said room.

According to another embodiment of the invention said arrangement comprises at least one spring member acting upon the movable means to carry out said movement, and the temperature dependent member is configured to prevent the spring member to make the movable means move and to release the spring member for activating said movement upon an increase of the temperature above said predetermined level.

According to another embodiment of the invention the temperature dependent member is formed by a part of the feeding line in the region of said position so as to activate said movement when this part of the feeding line is consumed by an arcing. This constitutes a simple and reliable way of realizing said temperature dependent member.

According to another embodiment of the invention said temperature dependent member comprises a solid body of a material melting or losing its mechanical strength at a temperature increasing above said predetermined level and by that activating a movement of said means.

Another option to realize said temperature dependent member is to have this comprising an explosive configured to generate an explosion upon an increase of the temperature thereof above said predetermined level so as to by that cause a movement of said movable means.

According to another embodiment of the invention each feeding line is provided with a plurality of said arrangements at positions spaced along the extension of the feeding line from the electrical energy source to the electrical energy sink. This makes it possible to stop arcing from travelling along the feeding line beyond several said positions, so that the damage caused by said arcing may be reduced. As arcing often is initiated at a failing interconnection it is particularly advantageous to provide one said arrangement on the fault current source side of each interconnection. In the case of mounting several arrangements having a said element with a ventilation tube in the vicinity of each other the outlets of the ventilation tubes should not be placed close to each other in order to not have a path of hot ionized gases between two cables that will provided a second path for sustained arcing.

The invention also relates to a rail vehicle having an electric system for the propulsion thereof according to the present invention.

Further advantages as well as advantageous features of the invention will appear from the following description.

BRIEF DESCRIPTION OF THE DRAWINGS

With reference to the appended drawings, below follows a specific description of embodiments of the invention cited as examples.

In the drawings:

FIG. 1a-c are simplified and very schematic views of a known electric system, for example for propulsion of a rail vehicle, FIGS. 2a-2c are views illustrating the construction and function of an arrangement in an electric system, for example of the type shown in FIG. 1 according to a first embodiment of the invention, FIGS. 3a-3c are views illustrating the construction and function of an arrangement in an electric system of, for example the type shown in FIG. 1 according to a second embodiment of the invention, FIGS. 4a-4c are views illustrating the construction and function of an arrangement in an electric system of, for example the type shown in FIG. 1 according to a third embodiment of the invention, FIGS. 5a-5c are views illustrating the construction and function of an arrangement in an electric system of, for example the type shown in FIG. 1 according to a fourth embodiment of the invention, FIGS. 6a-6c are views illustrating the construction and function of an arrangement in an electric system of, for example the type shown in FIG. 1 according to a fifth embodiment of the invention, FIGS. 7a-7c are views illustrating the construction and function of an arrangement in an electric system of, for example the type shown in FIG. 1 according to a sixth embodiment of the invention, and FIGS. 8a-8c are views illustrating the construction and function of an arrangement in an electric system of, for example the type shown in FIG. 1 according to a seventh embodiment of the invention.

DETAILED DESCRIPTION OF EMBODIMENTS OF THE INVENTION

FIG. 2a shows an arrangement in a first embodiment of an electric system, for example for propulsion of a rail vehicle, according to the present invention. At least one such arrangement is here arranged in a position P along each phase line 8 between the converter and the terminal of the electric machine. The arrangement comprises an element 19 of arc and heat resistant material surrounding an extension of the phase line including the position P and configured to form an at least partially enclosed room 20 around the position P. The element includes a main tube 21 concentrically surrounding the phase line 8 and secured with respect to the phase line by being clamped thereto by a clamping member 22. The element further comprises a ventilation tube 23 branched from the main tube in the region of the position P. A movable means in the form of a piston 24 is arranged inside the element in a lateral extension of the room 20 and a spring member 25 is acting thereupon in the direction towards the phase line 8. A temperature dependent member in the form of a melting pin 26 is arranged to prevent the spring member 25 to make the piston 24 move towards the phase line 8. The temperature dependent member 26 is configured to activate a movement of the piston 24 upon an increase of the temperature of this member above a predetermined level, which will always be reached if arcing occurs in the position P. This means that the pin 26 will then melt at said predetermined temperature, which may for instance be 300° C. or even higher, since the temperature of an arc can be in excess of 5000° C.

FIGS. 2b and 2c illustrates what is happening if an arcing A occurs on the converter side of the arrangement and reaches the position P. When the arcing reaches the room 20 as shown in FIG. 2b the pin 26 will melt and the piston 24 will move into the room 20 and cut off the arc a as shown in FIG. 2c and at the same time push air 27 arranged around the piston to blow hot ionized gases 28 required to maintain the arc away from the arc through the ventilation tube 23. This will efficiently interrupt the current conducted by the arc in the position P and prevent the arc from propagating further towards the electric machine.

A construction and function of an arrangement in an electric system according to a second embodiment of the invention is shown in FIGS. 3a-3c, and the main difference with respect to the first embodiment is that this arrangement has two counteracting pistons 124 instead of one and each is held back by a melting pin 126. Members of this embodiment corresponding to members in the first embodiment have been provided with the same reference numeral added with a 1 in front thereof. In the following embodiments this 1 will be replaced by a 2, a 3 and so on.

FIGS. 4a-4c illustrate the construction and function of an arrangement in an electric system according to a third embodiment of the invention in which the piston is replaced by an electrically insulating and heat resistant powder 230 held back by a temperature dependent member in the form of a melting barrier 229. When the arcing A reaches the position P as shown in FIG. 4b the melting barrier will melt and push the powder 230 to cut off the arc a as shown in FIG. 4c.

FIG. 5a-5c illustrate the construction and function of an arrangement in an electric system according to a fourth embodiment of the invention having a movable means in the form of a shutter 330 pivotally connected around a hinge 331 to the element 319 and held back to pivot by a temperature dependent member in the form of a melting pin 332. When arcing A reaches inside the element 319 as shown in FIG. 5b the melting pin 332 will melt and the shutter 330 will pivot to close the room 320 on the converter side thereof and seal it by sealing means 333 cutting off the arc a and removing hot ionized gases 328 through the ventilation tube 323.

The construction and function of an arrangement in an electric system according to a fifth embodiment of the invention is illustrated in FIGS. 6a-6c. This embodiment has a temperature dependent member in the form of an explosive 434. This explosive will generate an explosion upon an increase of a temperature thereof resulting when an arcing A reaches the position P and this explosion produces a force that moves the piston 424 to cut off the arc a. Any overpressure, e. g. from the combustion gases of the explosive and the hot ionized gases 428, enclosed in the room 420 is released through the ventilation tube 423.

FIGS. 7a-7c illustrate an arrangement in an electric system according to a sixth embodiment of the invention comprising a container 535 containing a gas 538 and being connected through a pipe 536 to the room 520 surrounding the phase line 508. A plug 537 of a heat sensitive material is obstructing the connection of the gas container 535 to the room 520. However, when an arcing A reaches the position of the heat sensitive plug 537 this will melt and the gas 538 will flow out of the container 535 and into the room 520 and remove the hot ionized gases 528 from the room on the converter side of the arrangement.

FIGS. 8a-8c illustrate the construction and function of an arrangement in an electric system according to a seventh embodiment of the invention. The movable means is in this embodiment a heat sensitive powder 639 being gasified above a temperature of a predetermined level which will be reached when an arcing A reaches the position P as shown in FIG. 8b. The gas flow 640 so generated will enter the room 620 and blow out the hot ionized gases 628 on the converter side of the room 620 and by that interrupt the arcing. The heat sensitive powder may for example be a material in the form of the gas generator utilized in air bags.

The invention is of course not in any way restricted to the embodiments described above, but many possibilities to modifications thereof will be apparent to a person with ordinary skill in the art without departing from the scope of the invention as defined in the appended claims.

It is once again pointed out that the invention is applicable to any electric system of the type defined in the introduction and that is of course also the case for the arrangement shown in FIGS. 2-8, which may be arranged anywhere and in any number along the feeding line between an electrical energy source and an electrical energy sink of such an electric system such as schematically illustrated in FIGS. 1a-1c.

The invention claimed is:

1. An electric system comprising:
an electrical energy source (500), and
an electrical energy sink (2) connected to the electrical energy source through at least one feeding line,
wherein said at least one feeding line is in at least one position therealong between said source and said sink provided with an arrangement configured to interrupt arcing in the feeding line would such arcing reach said position, and
said arrangement comprises a temperature dependent member (26, 126, 229, 332, 434, 537) arranged close to the feeding line in said position and configured to, upon an increase of the temperature thereof above a predetermined level, activate an irreversible movement of movable means (24, 124, 230, 330, 424, 538, 640) included in the arrangement and configured to by this movement cut off the arc (a) and/or remove hot ionized gases (28, 128, 228, 328, 428, 528, 628) required to maintain the arc to prevent the arcing to continue in this feeding line.

2. An electric system according to claim 1, wherein the temperature dependent member is formed by a part of the feeding line (8-10) in the region of said position (P) to activate said movement when this part of the feeding line is consumed by an arcing (A).

3. An electric system according to claim 1, wherein said temperature dependent member comprises a solid body (26, 126, 229, 332, 537) of a material melting or losing its mechanical strength at a temperature increasing above said predetermined level and activating movement of said means.

4. An electric system according to claim 1, wherein said temperature dependent member comprises an explosive (434) configured to generate an explosion upon an increase of the temperature thereof above said predetermined level to cause a movement of said movable means (424).

5. An electric system according to claim 1, wherein each feeding line (8-10) is provided with a plurality of said arrangements at positions spaced along the extension of the feeding line from the electrical energy source (1) to the electrical energy sink (2).

6. An electric system for propulsion of a rail vehicle (V), comprising:
an electrical energy source (500), and
an electrical energy sink (2) connected to the electrical energy source through at least one feeding line,
wherein said at least one feeding line is in at least one position therealong between said source and said sink provided with an arrangement configured to interrupt arcing in the feeding line would such arcing reach said position,
said arrangement comprises a temperature dependent member (26, 126, 229, 332, 434, 537) arranged close to the feeding line in said position and configured to, upon an increase of the temperature thereof above a predetermined level, activate an irreversible movement of movable means (24, 124, 230, 330, 424, 538, 640) included in the arrangement and configured to by this movement cut off the arc (a) and/or remove hot ionized gases (28, 128, 228, 328, 428, 528, 628) required to maintain the arc to prevent the arcing to continue in this feeding line; and as said electrical energy sink;
an electric machine (2) configured to act as a motor for creating a force of a rail vehicle and comprising:
a) a stator having a stator body with at least one phase (4-6) formed by a stator winding wound therearound and configured to electrically create a plurality of stator poles disposed around the inner periphery of the stator body, and
b) a rotor rotatably disposed within the stator and having a rotor body with a plurality of permanent magnets received therein,
the system further comprising a converter (1), one side of which being connected to the electrical energy source and the other side of which being connected to terminals (11-13) of each phase of the electric machine through electric conductors in a feeding line in the form of a phase line (8-10) for each phase for feeding electric power between the converter and the electric machine, and
said feeding line is provided with said arrangement in at least one said position located along the feeding line between the electric energy source and the converter and/or in at least one said position located along the feeding line between the converter and the electric machine.

7. An electric system according to claim 6, wherein each phase line is in at least one position (P) therealong between the converter (1) and the terminal (11-13) of the electric machine (2) for that phase provided with said arrangement configured to interrupt arcing in the phase line (8-10) would such arcing reach said position from the converter side thereof.

8. A rail vehicle having an electric system for propulsion thereof according to claim 6.

9. An electric system for propulsion of a rail vehicle (V), comprising:
an electrical energy source (500), and
an electrical energy sink (2) connected to the electrical energy source through at least one feeding line,
wherein said at least one feeding line is in at least one position therealong between said source and said sink provided with an arrangement configured to interrupt arcing in the feeding line would such arcing reach said position,
said arrangement comprises a temperature dependent member (26, 126, 229, 332, 434, 537) arranged close to the feeding line in said position and configured to, upon an increase of the temperature thereof above a predetermined level, activate an irreversible movement of movable means (24, 124, 230, 330, 424, 538, 640) included in the arrangement and configured to by this movement cut off the arc (a) and/or remove hot ionized gases (28, 128, 228, 328, 428, 528, 628) required to maintain the arc to prevent the arcing to continue in this feeding line,
said electrical energy source is a DC source in the form of a battery, a fuel cell or a shoegear or pantograph obtaining the energy from a DC-contact line (30),
the system further comprises a line circuit breaker (31), one side of which being connected to the electrical energy source and the other side of which being connected to the electrical energy sink, and
said arrangement is arranged in a position along a line connecting said line circuit breaker (31) to the electrical energy source and configured to interrupt arcing in said line would such arcing reach said position from the line circuit breaker side thereof.

10. An electric system comprising:
an electrical energy source (500), and
an electrical energy sink (2) connected to the electrical energy source through at least one feeding line, wherein said at least one feeding line is in at least one position therealong between said source and said sink provided with an arrangement configured to interrupt arcing in the feeding line would such arcing reach said position,
said arrangement comprises a temperature dependent member (26, 126, 229, 332, 434, 537) arranged close to the feeding line in said position and configured to, upon an increase of the temperature thereof above a predetermined level, activate an irreversible movement of movable means (24, 124, 230, 330, 424, 538, 640) included in the arrangement and configured to by this movement cut off the arc (a) and/or remove hot ionized gases (28, 128, 228, 328, 428, 528, 628) required to maintain the arc to prevent the arcing to continue in this feeding line, and
said arrangement comprises an element (19, 119, 219, 319, 419, 519, 619) of arc and heat resistant material surrounding an extension of the feeding line (8-10) including said position and configured to form an at least partially enclosed room (20, 120, 220, 320, 420, 520, 620) around said position to have an arc cut off and/or hot ionized gases removed in that room by movement of said means.

11. An electric system according to claim 10, wherein said element includes a main tube (21) concentrically surrounding the phase line (8-10).

12. An electric system according to claim 11, wherein said arrangement comprises a clamping member (22) configured to clamp the main tube (21) to the feeding line.

13. An electric system according to claim 11, wherein said element includes a ventilation tube (23) branched from the main tube (21) in the region of said position (P) to remove any possible over-pressure caused in said room by the movement of said movable means and release hot ionized gases away from the place of arcing.

14. An electric system according to claim 10, wherein one or several said movable means (24, 124, 230, 330, 424) are configured to carry out said movement to cut off an arc (a) in said room (20, 120, 220, 320, 420) upon consumption of the feeding line (8-10) by said arcing past a location where the movable means will move.

15. An electric system according to claim 14, wherein one or several said movable means comprise a body (24, 124, 230, 424) configured to cut off an arc by movement thereof in said room.

16. An electric system according to claim 15, wherein one or several said movable means are made of a flexible material which when compressed in one direction will expand in other directions.

17. An electric system according to claim 15, wherein the movable means are made of a powder (228) of an electrically insulating and heat resistant material.

18. An electric system according to claim 15, wherein said arrangement comprises at least one spring member (25, 125) acting upon said movable means (24, 124) to carry out said movement, and the temperature dependent member (26, 126) is configured to prevent the spring member to make the movable means move and to release the spring member for activating said movement upon an increase of the temperature above said predetermined level.

19. An electric system according to claim 14, wherein one or several said movable means (330) are configured to close said room (320) when the arc has reached into the room by carrying out said movement.

20. An electric system according to claim 10, wherein said movable means (538, 640) comprises an arc extinguishing substance, for instance in the form of a gas or liquid, configured to move into said room when the feeding line (8-10) has been consumed to a location inside said room (520, 620) to remove hot ionized gases (8-10) from said room by blowing/pushing them out thereof towards the electrical energy sink side thereof.

21. An electric system according to claim 20, wherein said arrangement comprises a container (535) containing said movable means (538) and having a connection (536) to said room (520), and the temperature dependent member (537) is configured to keep this connection closed at a temperature below said predetermined level and to open it upon an increase of the temperature above said predetermined level.

22. An electric system according to claim 20, wherein said arrangement comprises said movable means (639) in the form of a solid material arranged in the region of said room (620) and configured to be gasified by a temperature increase in said room upon an arcing (A) entering said room to move into said room.

\* \* \* \* \*